United States Patent [19]

Jansen et al.

[11] 4,301,417

[45] Nov. 17, 1981

[54] QUADRIPHASE DIFFERENTIAL DEMODULATOR

[75] Inventors: Augustinus M. Jansen, Vught; Arien Groot, Veenendaal, both of Netherlands

[73] Assignee: NCR Corporation, Dayton, Ohio

[21] Appl. No.: 129,797

[22] Filed: Mar. 12, 1980

[51] Int. Cl.³ .......................................... H04L 27/22
[52] U.S. Cl. ......................................... 329/50; 329/105; 329/122; 329/126; 375/85; 375/108; 375/120
[58] Field of Search .............. 329/50, 104, 105, 110, 329/122, 124, 126; 375/84–86, 106, 111, 118–120

[56] References Cited

U.S. PATENT DOCUMENTS

| | | | |
|---|---|---|---|
| 3,209,265 | 9/1965 | Baker et al. | 328/63 |
| 3,535,452 | 10/1970 | Oswald | 375/85 |
| 3,818,346 | 6/1974 | Fletcher et al. | 375/85 |
| 3,838,350 | 9/1974 | Ewanus et al. | 329/104 |

*Primary Examiner*—Siegfried H. Grimm
*Attorney, Agent, or Firm*—J. T. Cavender; Wilbert Hawk, Jr.; Richard W. Lavin

[57] ABSTRACT

A method and apparatus for synchronizing a digital data demodulator to a received phase modulation carrier signal in which the carrier signal is phase shifted during each modulation period of the carrier to represent one of four pairs of binary bits or dibits. A dibit clock is adjusted to the phase of a reference dibit clock whose output is used to synchronize the demodulator in establishing the location of the modulation period of the incoming carrier. In order to overcome errors found in the decoding of the carrier signal, the adjustment of the dibit clock is suppressed when the dibits 00 and 10 are being decoded.

17 Claims, 12 Drawing Figures

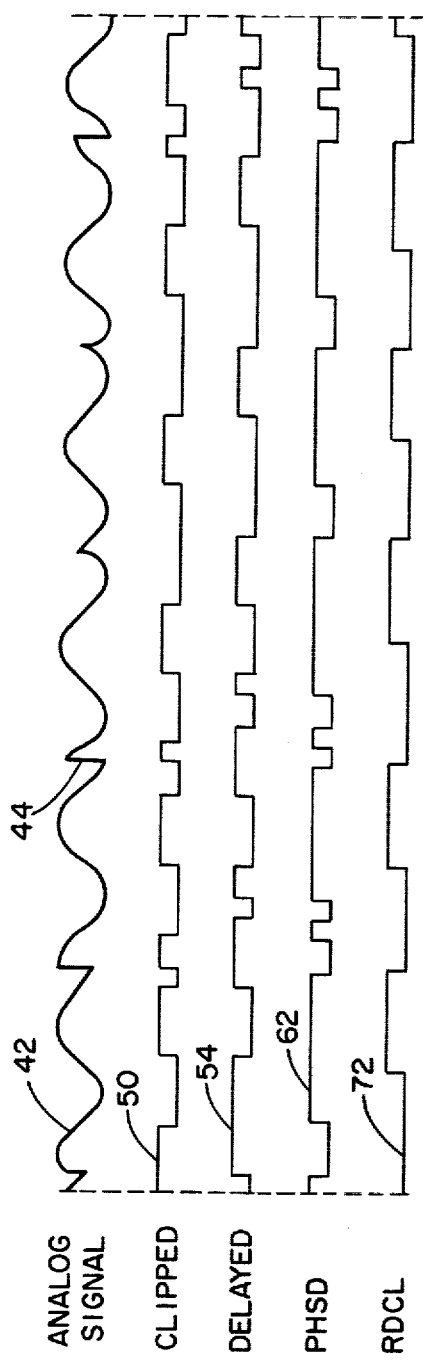

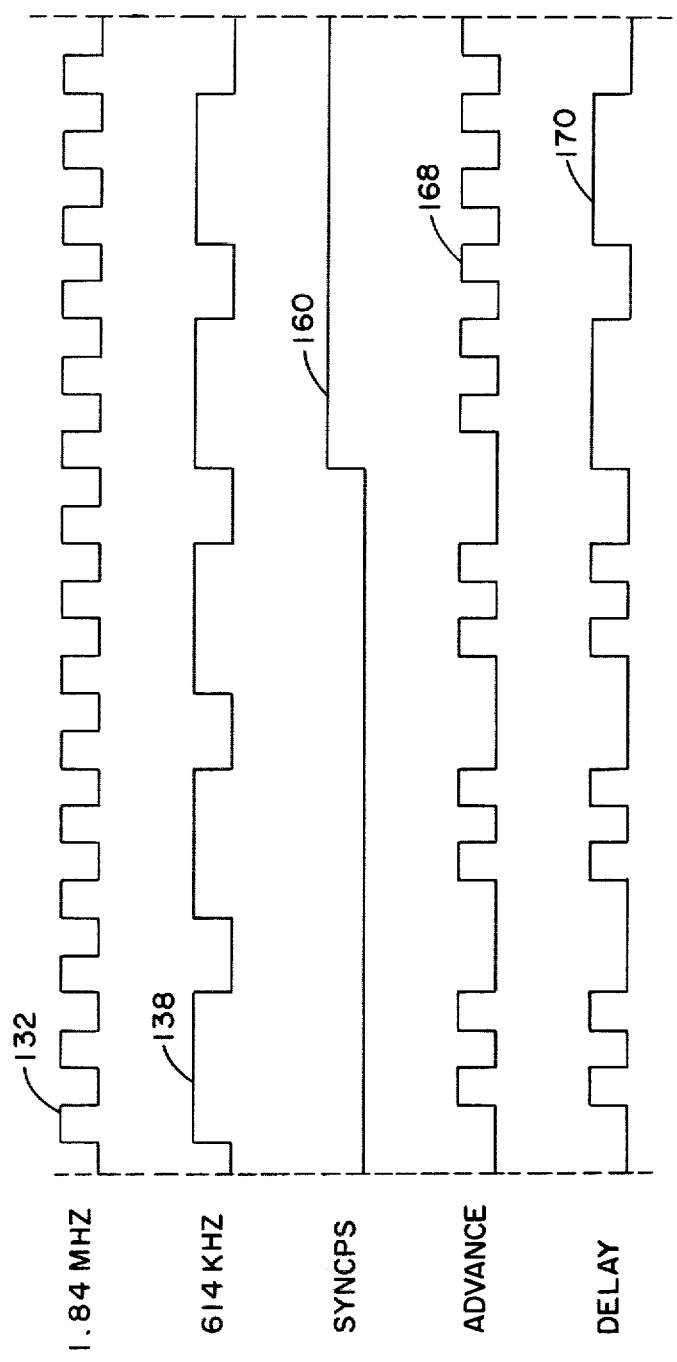

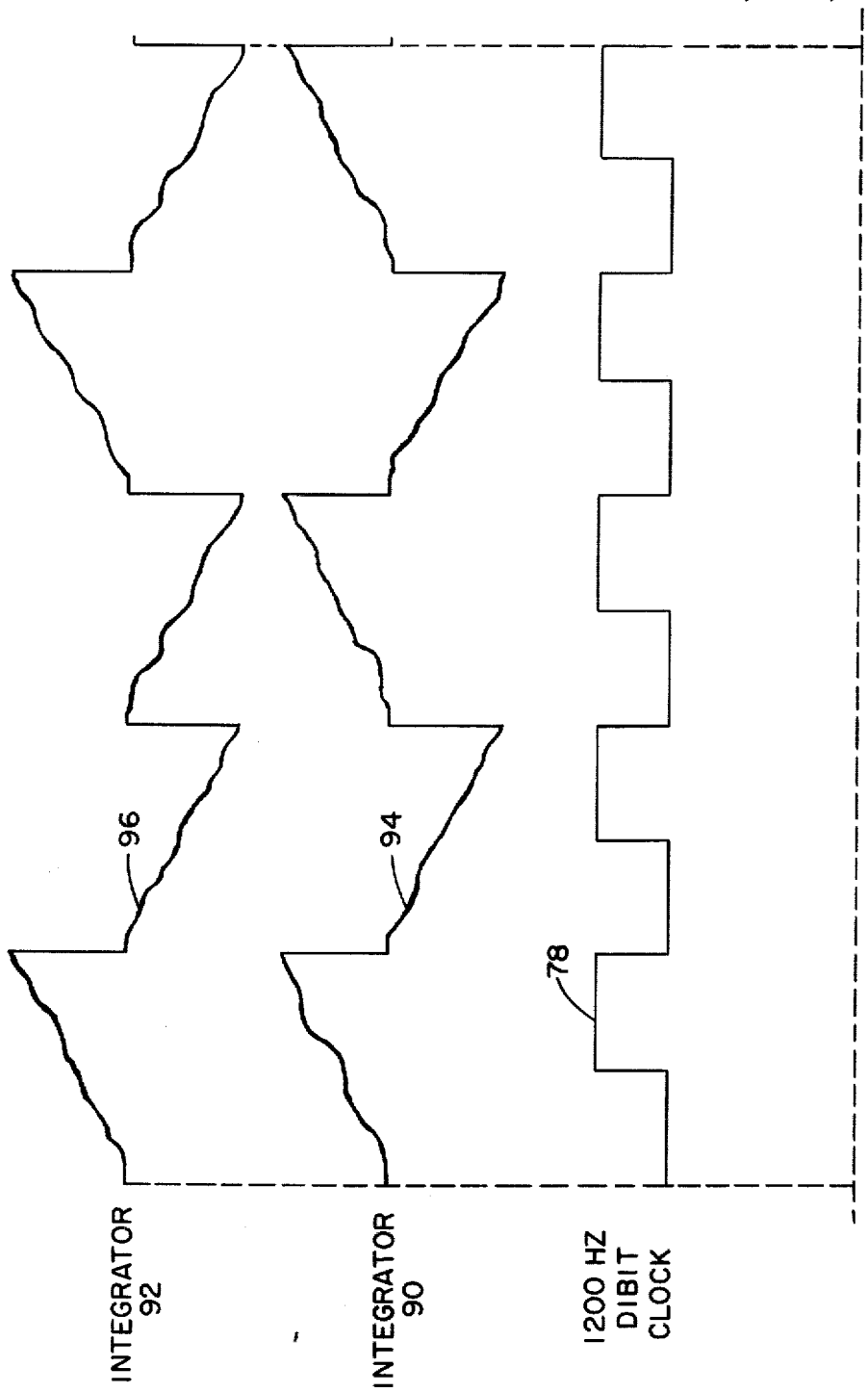

QUADRIPHASE DIFFERENTIAL DEMODULATOR

BACKGROUND OF THE INVENTION

This invention relates to the demodulation of differentially encoded quadriphase transmissions and more specifically to improved demodulation thereof.

In a communication system using quadriphase transmissions, information desired to be transmitted is impressed upon a carrier signal of a given frequency by effecting predetermined phase shifts in a carrier signal corresponding to the information to be transmitted. The transmission of this carrier signal is characterized as the differentially encoded quadriphase transmission which transmits four possible information words with each word consisting of two binary bits referred to hereinafter in this application as "dibits." Differentially encoded quadriphase transmission transmits each word as a given increment in phase relative to the absolute phase of the preceding transmitted word.

In utilizing demodulators for the above-cited differentially encoded quadriphase transmissions, the demodulator determines the phase increments of the received signal and decodes the binary data from these phase increments. These phase increments are detected utilizing a reference signal. The received signal and a 90 degree phase shifted receive signal are then multiplexed with the reference signal and a signal representing the reference signal shifted by 90 degrees. The resulting signals are fed into a plurality of integrators having an integration period equal to the period of one reference signal to obtain the detected I (in-phase) and Q (quadrature) signals from which the phase difference can be determined and proper coherent demodulation can then occur. Due to the quality of the transmission line or the like, the quality of the transmission signals deteriorate to the point that the recovery of the data transmission is very low. It is therefore an object of the present invention to provide a novel and improved data modulator apparatus. It is a further object of this invention to provide a data demodulator apparatus including a timing and synchronization circuit which corrects for any deterioration of the quality of the transmission signal.

SUMMARY OF THE INVENTION

These and other objects of the invention are fulfilled by providing a unique correction circuit incorporated within the circuitry of a conventional differentially coherent demodulator for synchronizing a receiver clock with the rate of the modulating signal. In demodulating synchronous, differentially coherent, four phase data transmissions, the modulation interval or period during which the phase of the carrier frequency is altered must be determined. This period is used in establishing the modulation rate of the incoming data transmission. In addition, a dibit clock located in the receiver is synchronized with this modulation rate to establish a timeframe for use in the data demodulation operation. The demodulating process involves establishing a pseudo-carrier which is phase locked to the incoming carrier. This pseudo-carrier is phase locked by detecting the average phase position of the carrier over successive modulation intervals. The pseudo-carrier not only tracks the frequency of the carrier but assumes a stable phase position which can be used to establish the most probable location of the four possible carrier phases of each modulation interval. Once the phase position reference is established, the incoming carrier is investigated in each modulation interval to determine which of the four phase positions it most closely approximates. The approximated phase position is then assigned and stored as a reference for the next interval. The assigned phase position indicates the phase change and the proper two bit binary number or dibit which is then outputted as data to a receiving terminal. It is apparent that if an error is made in the assigned phase position, a false reference is established for the next interval. In generating the modulation rate, a reference oscillator is compared in a phase locked loop whose input is the modulation rate of the incoming signal and which adjusts the phase of the reference oscillator to the phase of the modulation rate. It has been found that in transmitting data consisting of long series of the dibits 00 and 10, the demodulator failed to decode the data due to the delay and amplitude distortion found in telephone lines. In order to overcome this problem, it is found that by suppressing the operation of the phase locked loop during the occurrence of the dibits in question, the decoding failure is eliminated or drastically reduced.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify corresponding elements.

FIG. 4 is a waveform diagram showing some of the signals generated in receiving the receiver dibit clock.

FIG. 5 is a waveform diagram showing the signals associated with the dibit clock circuit of FIG. 10.

FIGS. 6A and 6B taken together form a waveform diagram showing signals generated in demodulating the incoming signal and in recovering the receiver dibit clock.

DESCRIPTION OF THE PREFERRED EMBODIMENT

Figure 1:
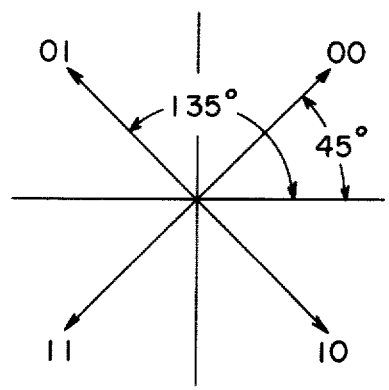
FIG. 1 is a vector diagram useful in explaining four phase differentially coherent modulation.
Figure 2:
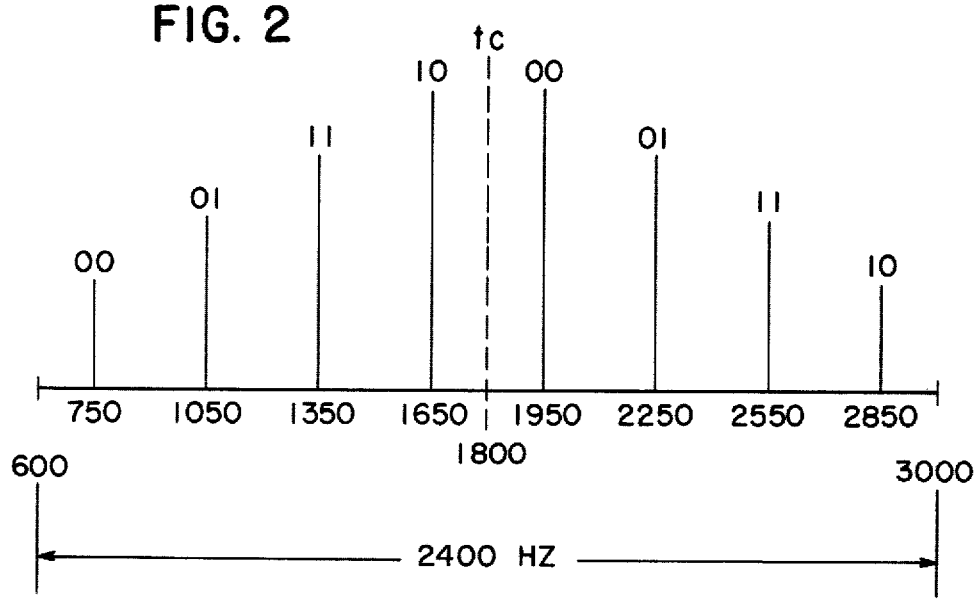
FIG. 2 is a diagram illustrating the line signal spectrum of each of the designated dibit codes.

In synchronous, differentialy coherent four phase modulation systems, the serial data to be transmitted is arbitrarily grouped into pairs of binary bits or dibits. During transmission, each pair of bits will cause a carrier frequency to be altered such that during a specific interval, the carrier signal will undergo one of four precise phase changes. As shown in the vector diagram of FIG. 1, the carrier signal will undergo a phase change of plus 45 degrees representing the dibits 00, minus 45 degrees representing the dibits 10, plus 135 degrees representing the dibis 01 or minus 135 degrees representing the dibits 11. The binary bits which are to be transmitted are grouped into pairs at a rate of 1200 pairs per second, thereby generating a modulation interval of 1/1200 of a second. As shown in FIG. 2, which illustrates the frequency spectrum of the transmitted dibit codes, each of the four possible dibit codes is associated with two frequencies which differ by 1200 Hz. representing the modulation rate. The nominal carrier center frequency is assumed to be 1800 Hz. As will be disclosed more fully hereinafter, it was found tht the two outer dibits 00 and 10, in being at the edges of the available frequency band, are rendered less suitable in detecting the modulation interval due to the circuit quality at the band edges.

Figure 3A:
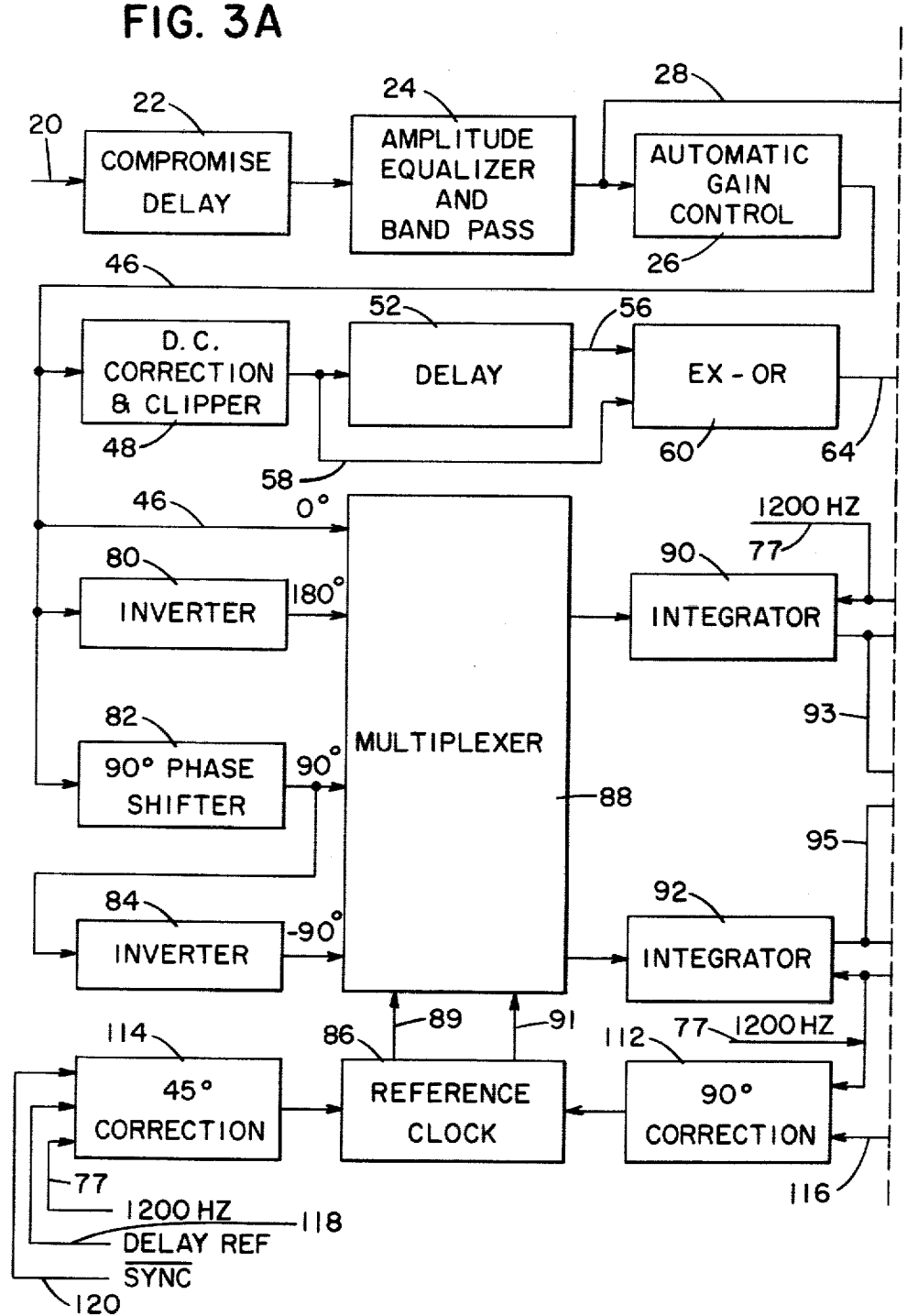
FIGS. 3A and 3B taken together form a block diagram of the demodultor apparatus embodying the present invention.
Figure 3B:
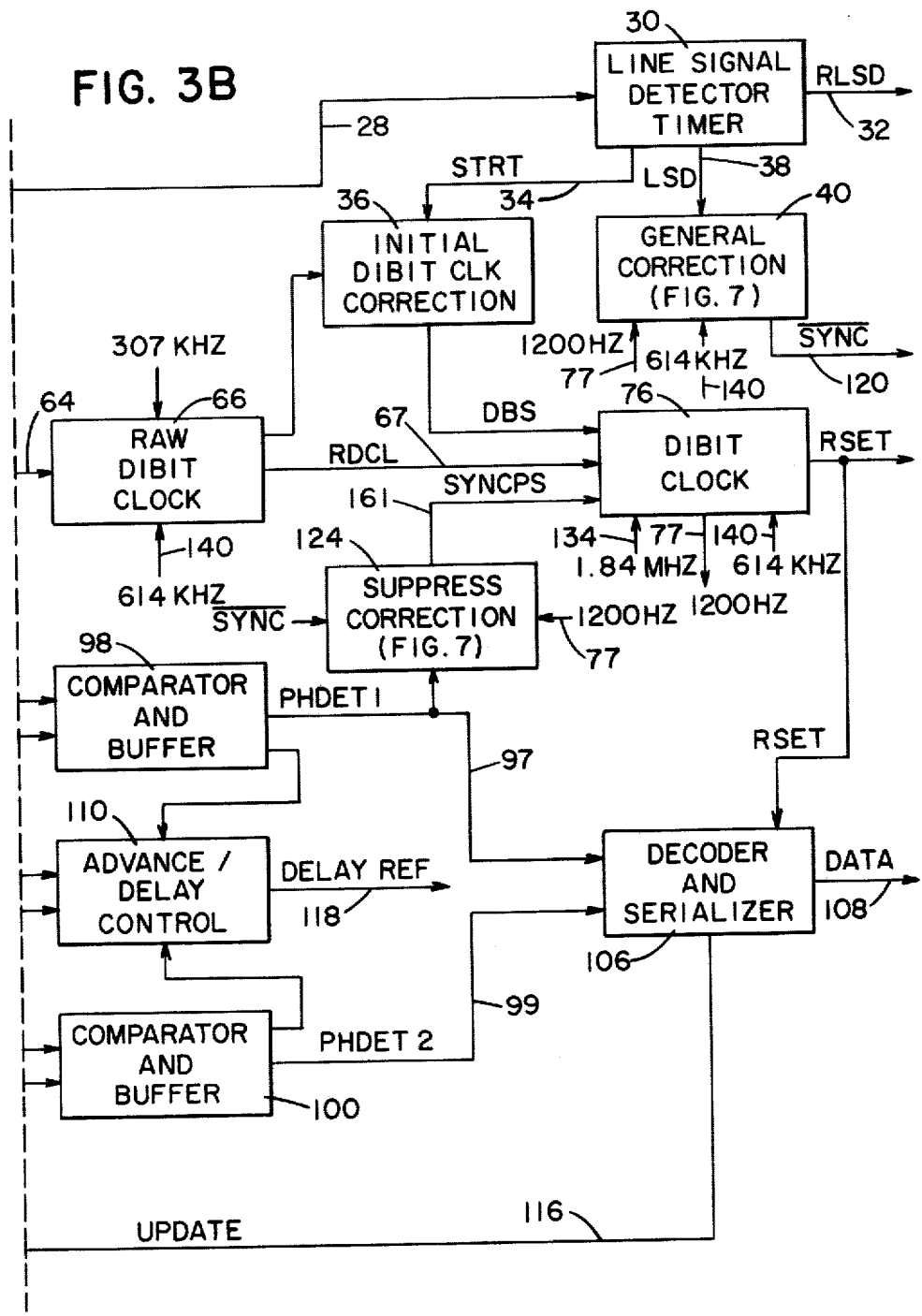

Referring now to FIGS. 3A and 3B taken together, there is disclosed a block diagram of the demodulator 20 which embodies the present invention. In a manner that is well-known in the art, the transmitter (not shown) will output over telephone lines a series of modulated phase shifted carrier signals in accordance with CCITT (recommendation V.26, alternaive B), which signals are transmitted over line 20 (FIG. 3A) to a compromise delay equalizer circuit 22 and an amplitude equalizer and band pass circuit 24 which attenuates out-of-band noise and provides fixed compromise equalization of delay and amplitude distortion generated as a result of transmitting over the phone lines. The filtered signal is then transmitted to an automatic gain control circuit (AGC) 26 to enable the receiver demodultor to optimally operate on the received signals in the range of 0 to −36 dBM without operator adjustment. The filtered signal is also transmitted over line 28 (FIGS. 3A and 3B) to a line signal detector timer 30 (FIG. 3B) which, upon sensing a signal level greater tha −36 dBM, will generate a delayed signal RLSD over line 32 to a receiving terminal (not shown), a start signal STRT over line 34 to one input of an AND gate 36 comprising an initial dibit clock correction circuit and a signal LSD over line 38 to a general correction circuit 40 whose operation will be described more fully hereinafter.

The analog signal appearing on the output of the AGC circuit 26 (FIG. 3A), which may take the waveform 42 of FIG. 4 representing the dibit 11, is transmitted over line 46 to a dibit clock recovery circuit and a demodulation circuit. The dibit clock recovery circuit decides what constitutes a dibit period or modulation interval. In demodulating the incoming signal, the demodulator must know the period over which the phase change must be measured. This modulation interval can be obtained by making use of the fact that in every dibit interval there is a point where the apparent carrier undergoes its maximum rate of change of phase. One of these locations is designated in waveform 42 of FIG. 4 by the numerical designation 44. If this point of occurrence is established, it may be used to detect the modulation rate or dibit period. Once the dibit period has been established, a time frame exists for the data demodulation operation to occur.

The normalized analog signal being outputted by the AGC circuit 26 over line 46 is passed through a D.C. correction and clipping circuit 48 which compensates for the variation in the average D.C. level of the signal that inherently results from the phase modulation in addition to producing the digital signal (CLIPPED) 50 illustrated in FIG. 4. The signal 50 is transmitted through a delay circuit 52 (FIG. 3A) which may comprise a shift register which delays the signal a period equal to one-third of the dibit time. The delayed signal illustrated in FIG. 4 as signal 54 and appearing on line 56 (FIG. 3A) is compared with the signal 50 (FIG. 4) appearing on line 58 in an Exclusive OR circuit 60 which generates a phase shift detect signal (PHSD) 62 (FIG. 4) over line 64. This signal provides only a general indication of the dibit interval boundary as it lags the actual phase shift to a degree that depends on the particular dibit being transmitted and the phase of the carrier at the time of the shift.

Figure 8:
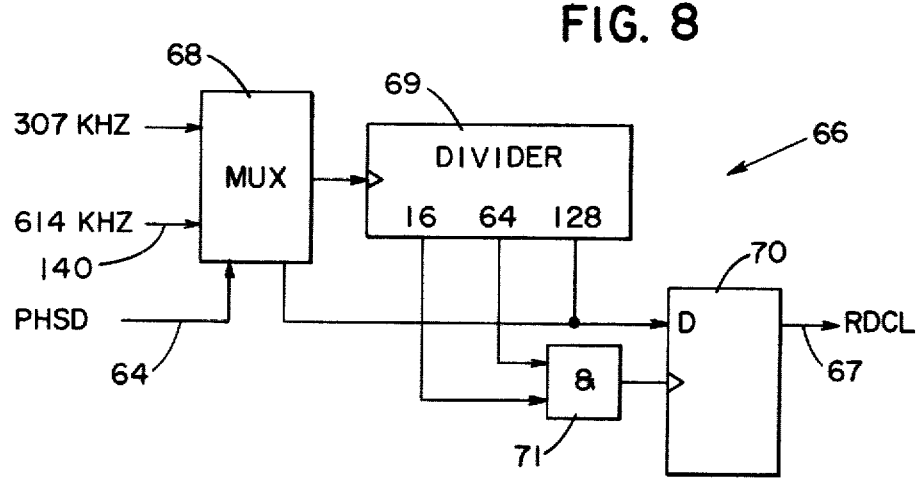
FIG. 8 is a block diagram of the phase locked loop circuit employed as the raw dibit clock circuit in the demodulator system of FIG. 3B.

The signal PHSD 62 is used to synchronize a 1200 Hz. generator designated as a raw dibit clock circuit 66 (FIG. 3B) and which may comprise a phase locked loop circuit (FIG. 8) including a multiplexer 68, a divider 69 and a flip-flop 70. The phase locked loop circuit of FIG. 8 is basically an oscillator with a nominal frequency of 1200 Hz. obtained by dividing the input frequencies 307 KHz. and 614 KHz. by 256. The phase of this square-wave oscillator is corrected so that the negative going edge of the raw dibit clock (RDCL) output signal 72 (FIG. 4) of the flip-flop 70 appearing on line 67 indicates the moment when the phase shift 44 (FIG. 4) in the received analog signal 42 is supposed to occur. The divider 69 is a binary counter which outputs the desired frequency at certain counter output stages in a manner that is well-known in the art. In the present instance, at the 128 stage of the divider 69, the divider outputs 1200 Hz. signals. If the rising edge of the RDCL signal 72 appears too early or too late with respect to the low periods on the PHSD signal 62 (FIG. 4), the divider 69 operation is adjusted to overcome this deficiency. It is found that arbitrarily delaying the RDCL signal 72 by 250 nanoseconds gives the best results in demodulating the incoming carrier signal. This delay is realized by gating the 16 and 64 stages of the divider 69 (FIG. 8) through the AND gate 71 to the clock input of the flip-flop 70 for clocking the 1200 Hz. RDCL signal 72 over the output line 67.

The raw digit clock signal RDCL 72 (FIG. 4) contains much jitter due to the influence of the outputs of the signal PHSD 62 (FIG. 4). In order to overcome this condition, a dibit clock generator 76 (FIG. 3B) is utilized to output the actual receiver dibit clock signal of 1200 Hz. which is slowly adjusted to the average phase position of the raw dibit clock signal 72 (FIG. 4) by correction signals received from a suppress correction circuit 124 (FIG. 3B). The dibit clock generator 76 comprises a phase locked loop (FIG. 10) whose construction is similar to the raw dibit clock circuit 66 disclosed in FIG. 8. The corrections are carried out in a manner that will be described more fully hereinafter at every negative going edge of the actual receiver dibit clock by adjusting the receiver dibit clock output of the dibit clock generator 76 towards the phase of the RDCL signal 72 (FIG. 4) during a predetermined time period. During this time period, the receiver dibit clock output is advanced or delayed depending on the relative phase of the RDCL signal 72 in a manner that is well-known in the art. The 1200 Hz. receiver dibit clock signal is shown by the numerical designation 78 in FIG. 6A.

The dibit clock generator 76 is initially set by the signal DBS outputted by the clock correction circuit 36 (FIG. 3B) as long as the signal STRT is high. The signal STRT is raised when the signal detector timer circuit 30 senses the start of the carrier signal. When the signals LSD and RLSD go high again, the signal STRT goes low and a signal SYNCPS 160 (FIG. 5) outputted from the suppress correction circuit 124 in a manner to be described more fully hereinafter, will control the correction of the receiver dibit clock signals 78 (FIG. 6A) in the dibit clock generator 76 over a relatively long period upon the arrival of the carrier signal, thus allowing large corrections to occur initially in order to quickly produce a receiver dibit clock. Subsequently, this period is shortened gradually to reduce the amount of jitter in the receiver dibit clock.

As previously described, the demodulation of the incoming carrier requires the detection of the phase shift between two consecutive dibits. This is accomplished in the present embodiment by maintaining an 1800 Hz. reference clock which is updated at the end of the detection of each dibit and therefore forms a digitized copy of the carrier during the last dibit. Referring to FIG. 3A, the normalized analog signal 42 (FIG. 4) appearing on line 46 is inputted into a multiplexer 88, an inverter circuit 80 and a 90 degree phase shifter circuit 82 to provide a 90 degree phase shift of the incoming signal resulting in signals being 90 degrees and 180 degrees out of phase with the signal 42 appearing on line 46. The 90 degree shifted signal is transmitted to a second inverter circuit 84 whose negative 90 degree phase shifted output signal is compared, together with the output signal of the inverter circuit 80, the original signal 42 and the output signal of the phase shifter circuit 82, with two versions of the 1800 Hz. reference clock that have a relative phase shift of 90 degrees. The phase shifted 1800 Hz. reference clock signals are outputted from the reference clock generator 86 and transmitted to the multiplexer 88 over lines 89 and 91 (FIG. 3A).

Figure 6B:
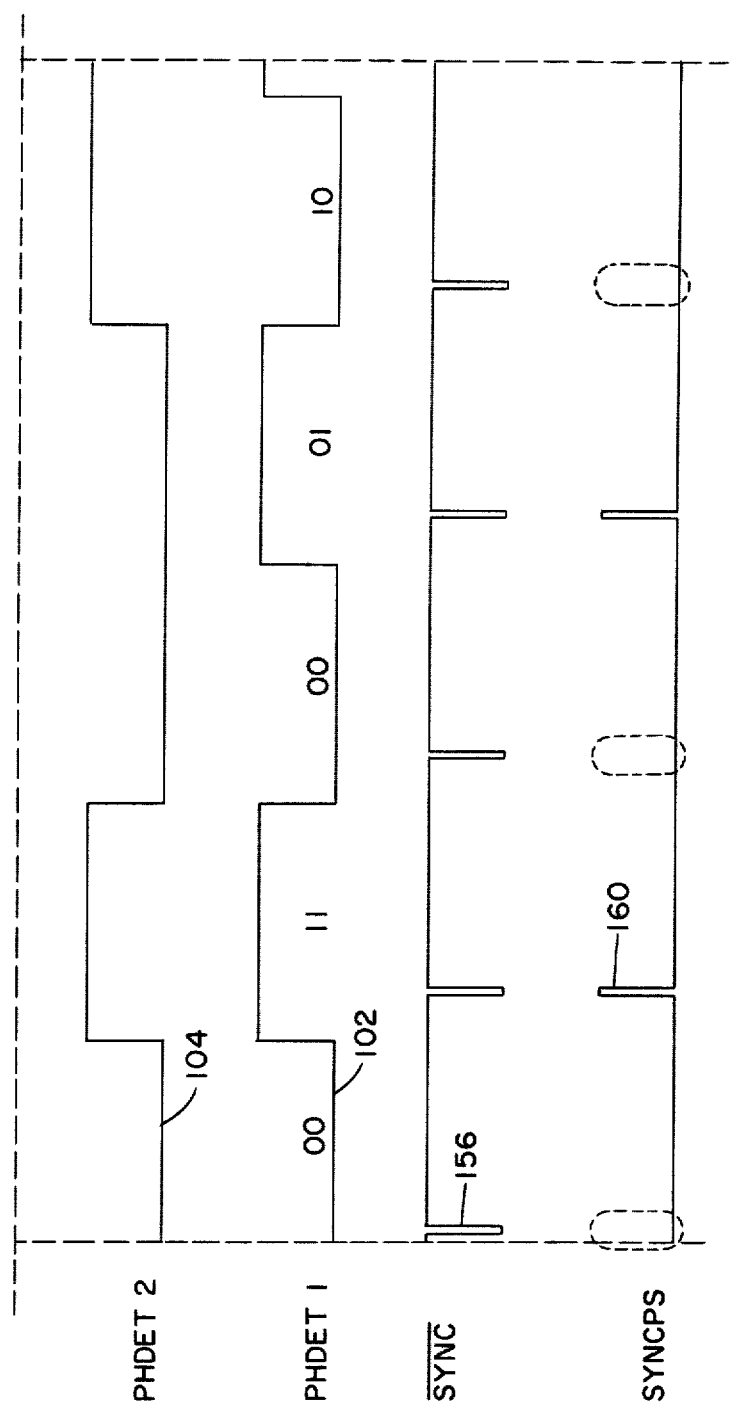

The comparison of the signals inputted into the multiplexer 88 is carried out by two conventional integrator circuits 90 and 92 (FIG. 3A). The polarity of the signals inputted into the integrator circuits and thus that of the output signals of the circuits will vary depending on which one of the four possible phase shifts have occurred during the dibit interval. The analog output signals 94 and 96 of the integrator circuits 90 and 92 respectively, shown in FIG. 6A, are synchronized by the negative going edges of the dibit clock signals 78 and are outputted over lines 93 and 95 (FIG. 3A) to a pair of comparator and buffer circuits 98 and 100 (FIG. 3B) which convert the analog signals to binary logic levels and store these signals with the 1200 MHz. receiver dibit clock signals 78 received over line 77 (FIG. 3A). The digitized output signals PHDET1 and PHDET2 appearing on lines 97 and 99 of the comparator circuits 98 and 100 are shown by the numerical designations 102 and 104 in FIG. 6B. The binary state of each of the signals 102 and 104 for each dibit is shown in the following table.

| DIBIT | PHDET1 | PHDET2 |
|-------|--------|--------|
| 00    | L      | L      |
| 01    | H      | L      |
| 11    | H      | H      |
| 10    | L      | H      |

These signals are transmitted to a decoder and serializer control circuit 106 (FIG. 3B) which decodes the signals 102 and 104 in accordance with the data set out in the above table in a manner that is well-known in the art.

The serial data is then outputted from the control circuit 106 over line 108 to the receiving terminal. The signals PHDET1 and PHDET2 are also transmitted to an advance/delay control circuit 110 (FIG. 3B) which detects any amplitude difference between the two incoming signals and outputs a control signal DELAY REF over line 118 to the reference clock generator 86 (FIG. 3A) in the following manner.

As shown in FIG. 3A, the 1800 Hz. reference clock generator 86 is provided two types of signals, one being a 90 degree correction signal received from the correction circuit 112 and the other a 45 degree correction signal received from the correction circuit 114. The correction circuit 112 receives over line 116 (FIGS. 3A and 3B) from the decoder and serializer circuit 106 the signal UPDATE which advances the clock phase over 1, 2, 3 or 4 times 90 degrees in accordance with the phase of the dibit decoded by the circuit 106 enabling the demodulator to decode the next dibit. The 45 degree correction circuit 114 receives in addition to the 1200 Hz. receiver dibit clock signals over line 77, the signal DELAY REF outputted from the advance/delay control circuit 110 (FIG. 3B) over the line 118 and the signal $\overline{SYNC}$ received over line 120 from the correction circuit 40 (FIG. 3B) which synchronizes the delaying of the phase of the 1800 Hz. reference clock by 45 degrees, thereby correcting any phase deviation due to the occurrence of the frequency shift in the telephone carrier system. The corrections taking care of the frequency shift are carried out by controlling the effective length of the signal DELAY REF which depends on the result of the amplitude comparison and the value of the received dibit.

Figure 7:
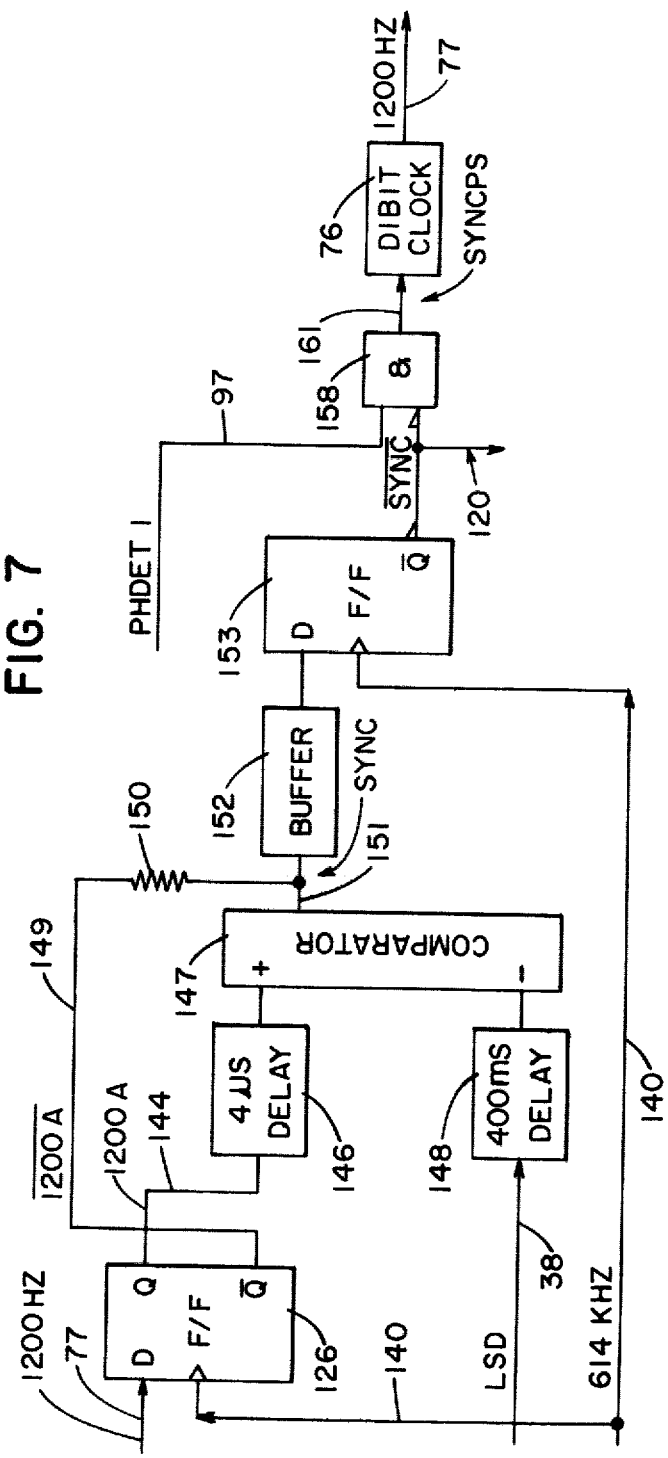
FIG. 7 is a block diagram of the general correction circuit and the suppression correction circuit employed by the demodulator system of FIG. 3B.
Figure 9:
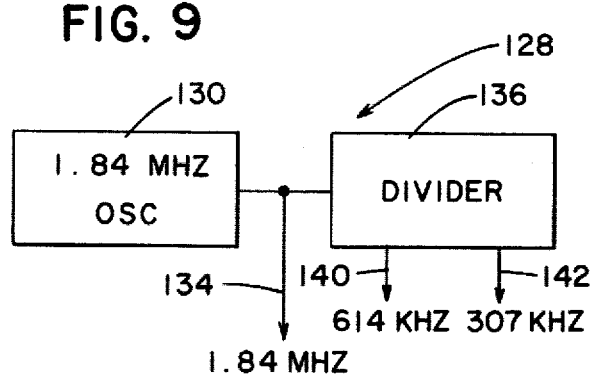
FIG. 9 is a block diagram of the oscillator used in generating the clock pulses used in the demodulator apparatus.

Referring now to FIG. 7 which discloses the circuit details of the present invention, there is shown a block diagram of the general correction circuit 40 (FIG. 3B) and the suppress correction circuit 124 (FIG. 3B) which suppresses the corrections made to the receiver dibit clock generator 76 (FIGS. 3B and 10) during the receipt of the dibits 00 and 10. Included in the general correction circuit 40 is a flip-flop 126 which receives the 1200 Hz. receiver dibit clock pulse 78 (FIG. 6A) from the dibit clock circuit 76 and a 614 KHz. clock from a clock generator generally indicated by the numerical 128 (FIG. 9) and which comprises a 1.84 MHz. oscillator 130 outputting the 1.84 MHz. clock pulse 132 (FIG. 5) over line 134 and a divider 136 which outputs 614 KHz. clock pulses 138 (FIG. 5) over line 140 and 307 KHz. clock pulses over line 142.

When the negative going edge of the 1200 Hz. receiver dibit clock signal 78 (FIG. 6A) outputted from the dibit clock circuit 76 (FIG. 3B) over line 77 appears at the D input of the flip-flop 126, the Q output of the flip-flop 126 will output the 1200A clock signal over line 144 to a 4 microsecond R.C. delay circuit 146 which transmits the signal to one input of a comparator circuit 147 having an open collector output. Prior to the sensing of a carrier signal on line 28 by the line signal detector timer 30 (FIG. 3B), the other input of the comparator 147 will receive a reference voltage from a 400 millisecond R.C. delay circuit 148 whose output voltage is a negative value at this time since the input signal LSD transmitted over line 38 from the timer 30 is low. The clocking of the flip-flop 126 by the 614 KHz. clock signal over line 140 will output the inverted clock signal 1200A over line 149 through a resistor 150 to the output line 151 of the comparator 147. Since the comparator 147 has an open collector output, the output of the comparator 147 is low when no positive voltage is applied to the output stage. The application of the 1200A clock signals over line 144 to the R.C. delay circuit 146 will result in a low signal appearing at the positive input of the comparator 147 resulting in the output of the comparator going low.

When a carrier signal appears, the signal LSD appearing on line 38 will go high, and the reference voltage level applied at the negative input of the comparator 147 and appearing on the output of the R.C. delay circuit 148 will slowly increase, the voltage level being equal to the charging voltage level of the capacitor in the circuit 148. As previously described, appearing on line 149 at this time is the inverted 1200A clock signal from the Q output of the flip-flop 126. As the reference voltage level applied to the negative input of the comparator 147 increases, the 1200A signal appearing on line 149 will be transmitted through the buffer 152 as the signal SYNC and over line 151 to the D input of a flip-flop 153 clocked by the 614 KHz. clock pulses appearing on line 140. The signal SYNC has a typical length at the time a carrier signal is detected of 27 cycles of the 614 KHz. clock. Due to the increasing of the voltage level of the reference voltage at the negative input of the comparator 147, the width of the signal SYNC will slowly decrease. As a result, the flip-flop 153 will output over the line 120 the slowly decreasing synchronizing pulse SYNC 156 (FIG. 6B) which is transmitted to the inverted input of an AND gate 158 whose output signal SYNCPS 160 (FIG. 6B) representing the decreasing width of the pulse SYNC is transmitted over line 161 to the phase locked loop circuit (FIG. 10) for controlling the time the phase of the receiver dibit clock signals 78 (FIG. 6A) are adjusted to the phase of the raw dibit clock signals RDCL 72 (FIG. 4).

Figure 10:
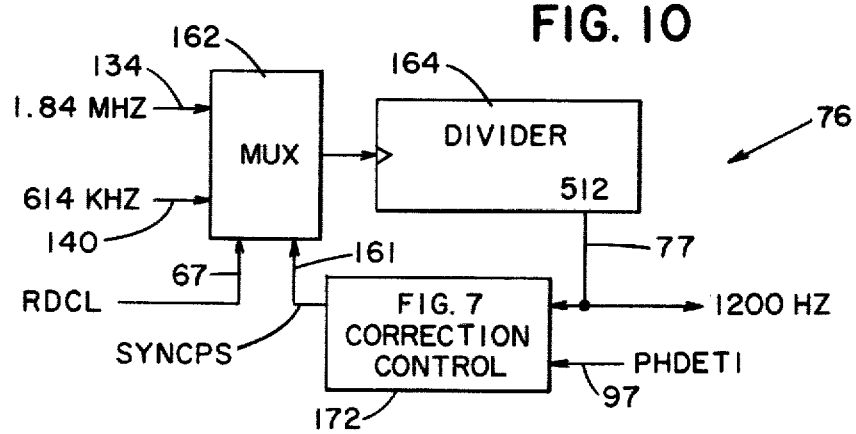
FIG. 10 is a block diagram of the phase locked loop circuit employed as the dibit clock circuit in the demodulator system of FIG. 3B.

The phase locked loop circuit (FIG. 10) comprising the dibit clock circuit 76 (FIG. 3B) operates to smooth the 1200 Hz. clock output signals of the raw dibit clock circuit 66 (FIG. 3B) in the following manner. Included in the phase locked loop circuit of FIG. 10 is a multiplexer 162 and a divider 164 which functions in the same manner as that of the phase locked loop circuit disclosed in FIG. 8. The divider 164 divides a nominal input clock frequency of 1.2288 MHz. derived from the clock signals appearing on lines 134 and 140 by 1,024 to output over line 77 the 1200 Hz. receiver dibit clock signal 78 (FIG. 6A). The phase of the 1200 Hz. receiver dibit clock signals appearing on the output line 77 of the divider 164 is adjusted to the phase of the incoming raw dibit clock signal RDCL over line 67 by temporarily applying a higher or lower input frequency following a comparison of the phase of the two 1200 Hz. clocks in the multiplexer 162. When the output signal SYNCPS 160 (FIG. 5) is high, pulses are inserted for advancing the phase of the 1200 Hz. receiver dibit clock while pulses are deleted for delaying the phase of such 1200 Hz. receiver dibit clock. The advancements are made by stopping the 614 KHz. clock signals 138 (FIG. 5), which enables the multiplexer 162 (FIG. 10) to output 1.84 MHz. pulses 168 (FIG. 5) to the divider 164 (FIG. 10). The delaying of the clock signals is made by stopping the 1.84 MHz. clock input enabling the multiplexer 162 to output the 614 KHz. pulses 138. For normal operation when SYNCPS is low, the output of the multiplexer 162 is 1.2288 MHz. which is the nominal input frequency of the receiver dibit clock circuit 76. As shown in FIG. 5, upon the signal SYNCPS going high, the divider 164 (FIG. 10) will receive the 1.84 MHz. control signals (ADVANCE) 168 of FIG. 5 as outputted by the multiplexer 162 (FIG. 10) when the dibit clock phase is late and receive the 614 KHz. control signals (DELAY) 170 of FIG. 5 when the dibit clock phase is early, enabling the divider 164 to lock the phase of the receiver dibit clock signals 78 (FIG. 6A) appearing on line 120 with the raw dibit clock signals (RDCL) 72 (FIG. 4) in the manner described above.

It is found that with the above correction circuit, certain of the dibits, namely the dibits 00 and 10, when received will result in the generation of an out-of-phase receiver dibit clock signal. In order to correct this condition, the corrections made to the receiver dibit clock circuit 76 by the correction control circuit 172 (FIG. 10) comprising the correction circuits 40 and 124 (FIGS. 3B and 7), in the manner described above the suppressed during the time the dibits 00 and 10 are detected in the receiving data. As shown in FIG. 7, the phase detect signal PHDET1 102 (FIG. 6B) is inputted over line 97 to the AND gate 158. As further shown in FIG. 6B, this signal PHDET1 102 will only be low during the time the dibits 00 and 10 are detected by the demodulation circuit of FIGS. 3A and 3B. Upon the occurrence of the low signal PHDET1 at the non-inverted input of the AND gate 158 (FIG. 7), the gate 158 will be disabled from outputting the high signal SYNCPS 160 (FIG. 6B) over line 161 to the dibit clock circuit 76, thereby suppressing the corrections made to the dibit clock circuit 76 by the correction circuit 172 of FIGS. 7 and 10 and enabling the existing phase of the 1200 Hz. receiver dibit clock signals 78 (FIG. 6A) to be maintained with the accuracy of the crystal control 1.84 MHz. clock 132 (FIG. 5).

Numerous modifications and adaptations of the system of the present invention will be apparent to those skilled in the art and thus it is intended by the appended claims to cover all such modifications and adaptations which fall within the true spirit and scope of this invention.

We claim:

1. In a differentially encoded phase-modulated data transmission system in which a carrier signal is phase shifted over a data interval at a modulation rate to represent one of a plurality of pairs of data bits for transmission to a receiver, a demodulator apparatus for decoding the transmitted pairs of data bits comprising:
   means for detecting the start of each data interval in the received carrier signal;
   means for generating first clock pulses in response to the detecting of said data intervals;
   means for generating second clock pulses in response to the generation of said first clock pulses;
   means for decoding the carrier signal to derive a first control signal representing a predetermined pair of data bits transmitted in response to receiving said second clock pulses;
   means for adjusting the phase of the second clock pulses to the phase of the first clock pulses;
   and means responsive to the generation of said first control signal for disabling the operation of said adjusting means.

2. The demodulator apparatus of claim 1 in which said predetermined pairs of data bits comprises the binary bits 00 and 10.

3. The demodulator apparatus of claim 2 in which said adjusting means includes:

means for generating a variable-length second control signal connected to said second clock pulse generating means;

and said second clock pulse generating means comprises a first phase locked loop means;

said demodulator apparatus further including a source of third clock pulses connected to said first phase locked loop means whereby said phase locked loop means adjusts the phase of said second clock pulses using said third clock pulses in response to receiving said variable-length second control signal.

4. The demodulator apparatus of claim 3 in which said variable-length second control signal is generated during a decreasing time period wherein said phase locked loop means adjusts the phase of said second clock pulses to the phase of said first clock pulses during the time period.

5. The demodulator apparatus of claim 4 in which said disabling means comprises gating means operated in response to receiving said first and second control signals for disabling said phase locked loop means from receiving said variable-length control signal.

6. The demodulator apparatus of claim 5 in which said gating means comprises an AND gate.

7. The demodulator apparatus of claim 6 in which said first clock pulse generating means comprises a second phase locked loop means operated in response to said detecting means detecting the start of a data interval.

8. In a differentially encoded phase-modulation data transmission system in which a carrier signal is phase shifted over a data interval at a modulation rate to represent a pair of data bits for transmission to a receiver, a demodulator apparatus in the receiver for decoding the transmitted data comprising:

means responsive to receiving said carrier signal for generating a first control signal representing the start of a data interval;

means for generating a first clock signal operated in response to receiving said first control signal;

means for generating a second clock signal in response to the generation of said first clock signal;

means for adjusting the phase of the second clock signals to the phase of the first clock signal;

demodulator means operated in response to receiving said carrier signal and said second clock signal for generating a second control signal representing a predetermined pair of said data bits, and means for disabling said adjusting means in response to the generation of said second control signal wherein the second clock signal will synchronize the operation of said demodulator means with the carrier signal containing the next pair of data bits.

9. The demodulator apparatus of claim 8 in which said adjusting means includes means for generating a variable-length third control signal and said second clock signal generating means comprises a first phase locked loop means responsive to the generation of said third control signal for adjusting the phase of the second clock signal to the phase of the first clock signal.

10. The demodulator apparatus of claim 9 in which said third control signal is generated during a decreasing time period wherein said phase locked loop means adjusts the phase of the second clock signal to the phase of the first clock signal during the time period.

11. The demodulator apparatus of claim 10 in which said disabling means comprises gating means receiving said second and third control signals and connected to said first phase locked loop means for disabling said phase locked loop means from receiving said third control signal upon the generation of said second control signal.

12. The demodulator apparatus of claim 11 in which said gating means comprises an AND gate.

13. The demodulator apparatus of claim 12 in which said first clock generating means comprises a second phase locked loop means operated in response to the generation of said first control signal for outputting said first clock signal representing the modulation rate of the carrier signal.

14. The demodulator apparatus of claim 13 in which said demodulator means includes:

means for generating a plurality of input signals each representing a different phase shift of the carrier signal;

reference oscillator means for outputting a plurality of phase corrected reference signals;

multiplexer means for comparing the phase shifted carrier signals and the phase corrected reference signals;

and integrator means connected to the output of said multiplexer means for outputting said second control signal in response to receiving said second clock signal.

15. A method for synchronizing the demodulation of a differentially encoded phase-modulated carrier signal in which the carrier signal is phase shifted over a data interval to represent one of a plurality of pairs of data bits comprising the steps of:

detecting the start of a data interval in the carrier signal;

generating a first clock pulse representing the data interval upon detecting the start of the data interval;

generating a second clock pulse representing approximately the data interval;

adjusting the phase of the second clock pulse to the phase of the first clock pulse;

demodulating the carrier signal in accordance with the phase of the second clock pulse to generate a first control signal representing a predetermined pair of data bits;

and disabling the adjusting step upon the generation of said first control signal.

16. The method of claim 15 in which the adjusting step further includes the steps of:

generating a variable-length control signal;

comparing the phase of the second clock pulse to the first clock pulse; and adjusting the phase of the second clock pulse to the phase of the first clock pulse during the time the variable-length control signal is generated.

17. The method of claim 16 in which the disabling step further includes the step of disabling the generation of the variable-length control signal upon the generation of said first control signal.

* * * * *